Feb. 19, 1957 R. J. DAVIES 2,781,785

RADIO SHIELDING FOR IGNITION CABLE AND METHOD OF MAKING SAME

Filed Sept. 29, 1952

INVENTOR.
Richard J. Davies
BY
Dale A. Bauer
ATTORNEY.

United States Patent Office 2,781,785
Patented Feb. 19, 1957

2,781,785

RADIO SHIELDING FOR IGNITION CABLE AND METHOD OF MAKING SAME

Richard J. Davies, Afton, N. Y., assignor to Bendix Aviation Corporation, New York, N. Y., a corporation of Delaware Application September 29, 1952, Serial No. 312,054

12 Claims. (Cl. 138—25)

This invention relates to radio shielding structures and more particularly to enclosures including flexible metallic conduits and the like adapted, among other things, for use as enclosures for electrical leads, such as the conductors of an engine ignition system.

Radio shielding of ignition systems, especially on aircraft engines, has been in relatively extensive use for about 30 years and during the entire history of the extremely active development of radio shielding ignition harnesses and leads, one of the foremost difficulties has been in providing a completely satisfactory flexible shielding conduit. Electrical leads enclosed by these conduits are subject to a relatively wide range of temperatures, the detrimental effects of dirt, grease and moisture, and the deteriorating bending stresses resulting from installation, repair and overhaul, and more particularly those resulting from the tremendous vibrations generated by air currents, engine operation and the like. One of the chief difficulties has also been in providing a suitable connection between the flexible portions and the necessary rigid portions or fittings of the shielding equipment.

It is accordingly an object of the present invention to provide a novel flexible shielding unit which is adapted for use as a radio shielding conduit for an electrical lead.

Another object of the invention is to provide a novel radio shielding unit which is both physically and electrically more durable and efficient than any ignition shielding conduit heretofore known.

Still another object is to provide a conduit of the above type which is novelly constructed in a manner which insures maximum flexibility so that sharp bending thereof does not set up dangerous internal stresses or strains.

A further object is to provide a conduit or enclosure of the radio shielding type wherein a flexible conduit is novelly connected or joined to a housing, end fitting or the like.

A still further object is to provide novel means for connecting a flexible-metallic conduit consisting of interwoven wire tubes to an end fitting or housing so as to effect a joint which is physically strong, moisture-tight and electrically efficient.

Another object is to provide a novel connector coupling between a flexible conduit and a rigid part, using a minimum number of parts of simple construction which are devoid of screw threads, nuts, bolts and the like.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

Figure 1:
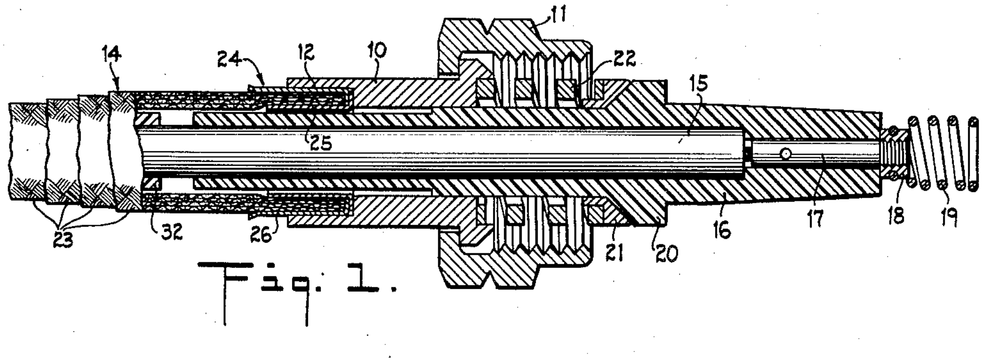
Figure 2:
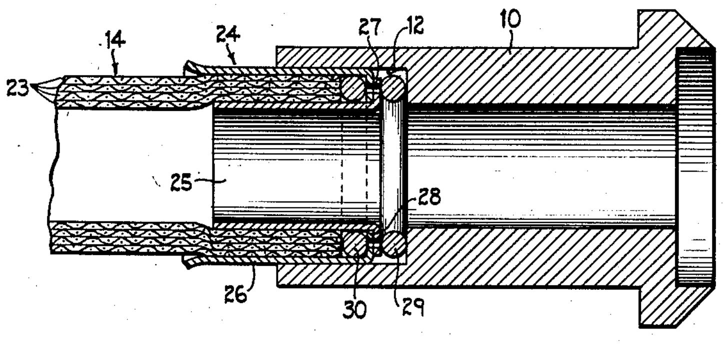
Figure 3:
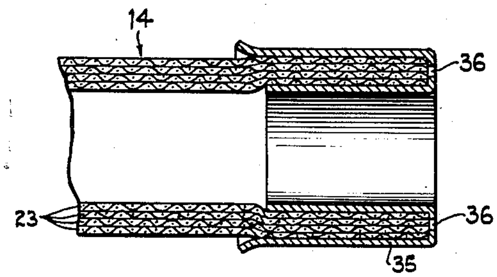
Figure 4:
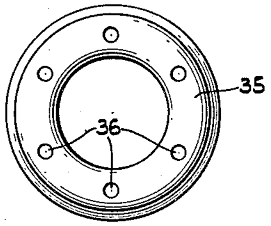

In the drawings, wherein like reference characters refer to like parts throughout the several views, Fig. 1 is an elevation view, partly in section and with parts broken away, showing a portion of one form of radio shielding enclosure embodying the present invention;

Fig. 2 is a detail view on an enlarged scale, showing the flexible conduit and ferrule assembly of the device of Fig. 1, the same being shown partly in section and just prior to final assembly; and, Figs. 3 and 4 are sectional side and end views, respectively, illustrating a modified form of ferrule which may be used in the device of Fig. 1.

The embodiment of the invention illustrated in Figs. 1 and 2 of the accompanying drawings, by way of example, is in the form of a shielded ignition lead adapted for detachable connection to the barrel of a shielded spark plug, the casing of a magneto or the like. The specific structure illustrated comprises a rigid tubular ferrule or end fitting 10, one end of which is externally flanged to cooperate in a known manner with a coupling nut 11 and the other end of which is internally counterbored at 12 for the reception of a flexible conduit 14 to be hereinafter more fully described. An insulated electrical conductor 15 extends through fitting 10 and is centrally supported therein by a flexible tube 16 of suitable insulating material, such as natural or synthetic rubber. The insulation is removed from the end portion of conductor 15 and a metallic sleeve 17 is attached thereto, such as by crimping of the sleeve. The latter fits a reduced bore in tube 16 and has an externally threaded portion which extends from the tube to threadedly receive a nut 18 which supports a coil contact spring 19. For a purpose which is not here material, the tube 16 has an external flange 20 and a metallic ring 21 and coil spring 22 are interposed between said flange and the flanged end of end fitting 10.

The present invention comprehends a novel flexible conduit connected by novel means to the rigid part 10 for providing an exceptionally flexible unit which embodies a strong and reliable connection of the flexible and rigid elements. In order to obtain maximum flexibility and at the same time insure satisfactory radio shielding properties, conduit 14 consists of a plurality of braided or interwoven wire tubes 23 of known construction. In the illustrated embodiment four tubes 23 are shown telescoped together to form a four-ply woven wire conduit. Each of said tubes is extremely flexible and relative slippage between the adjacent tubes is permitted. The multi-ply conduit thus constituted is considerably more flexible than prior known constructions having comparable physical and electrical properties. Interwoven wire tubes of this type are capable of considerable longitudinal contraction and elongation, thereby facilitating the sharpness of the bend or turn which may be effected with the compound conduit without setting up harmful internal stresses or strains. This renders it possible in many, and in fact most, instances to shorten the length of the lead between fixed terminals and thereby reduce the weight of a shielded system as well as the space required therefor.

The difficult problem of securing a compound or plural-ply conduit of the above type to a rigid end fitting, casing or the like in a satisfactory manner is solved by the novel connecting means to be now described. In the form shown, said means comprises a channel-shaped annulus or ferrule 24, i. e., a ferrule which is U-shaped or channel-shaped in radial section. Said ring or ferrule may be formed as a unitary structure or may consist of two concentric sleeves 25 and 26 having oppositely directed flanges 27 and 28, respectively, which overlap to form the closed inner end of the ferrule. The ferrule or the parts thereof are preferably made from relatively thin but rigid metal, such as copper, brass or the like. The tubes 23 of conduit 14 are preferably made of nickel, but other kinds of wire or strips may be used.

The end of the multi-ply conduit 14, 23 extends into the annular channel of ferrule 24 and is secured thereto by soldering. The enclosed end portions of the braided tubes are also connected to each other by soldering as are also the flanges 27 and 28. Ferrule 24 has a close fit in counter-bore 12 of the fitting 10 and is secured therein by soldering. The outer wall or sleeve 26 of ferrule 24 projects outwardly from fitting 10 and is preferably flared or bell-shaped to protect the outermost tube 23 from the damaging effect of sharp corners on the rigid parts during vibration and bending.

In one method of assembling the above unit, solder rings 29 and 30 are placed in counter-bore 12 and ferrule 24 prior to inserting the conduit 14 in the ferrule and the latter into end-fitting 10. The partially assembled parts, as shown in Fig. 3, are then subjected to sufficient heat, such as by electrical induction, to fuse the solder rings 29 and 30. Simultaneously with the application of heat, the unit is subjected to a longitudinal or axial pressure. As the solder rings soften and melt, the conduit 14 and fitting 10 move with respect to ferrule 24 and into the desired relationship therewith. Upon cooling the solder simultaneously effects unions between the end portions of conduit 14, 23 within ferrule 24, between said conduit and the ferrule, between said ferrule and fitting 10, and when said ferrule is made up of two sleeves, between said sleeves. Care should be taken to prevent the solder from reaching the walls of the flexible conduit outside of ferrule 24. To this end, care should be taken to apply soldering flux to only those surfaces to which it is desired to adhere another part.

A further and preferred method of assembling the conduit, ferrule and end-fitting is to first apply a small amount of solder to the end of the conduit to temporarily connect the ends of the braided layers and prevent ravelling thereof. The inner and outer walls of a ferrule having a perforated end wall and the end of the conduit are coated with flux and assembled. The ferrule is then sized by compressive pressure to insure a good fit in the end-fitting which is also coated with flux. A ring of solder is then placed in the end-fitting and the latter is assembled on the ferrule. Upon heating to melt the solder the parts are axially compressed until the ferrule butts against the shoulder in the end-fitting. The fused solder flows into the ferrule through the perforated end wall thereof and effects the necessary bonds both inside and outside of the ferrule.

As illustrated in Figs. 3 and 4 a one piece ferrule 35 may be used in lieu of the two piece ferrule 25, 26. The end wall is preferably perforated as shown at 36 to permit solder to flow into the end of the conduit during the final assembly step. This procedure permits the swaging of the ferrule onto the conduit before assembly with the end-fitting.

The shielding unit or enclosure thus described may, if desired, have the space therein around conductor 15 filled with yieldable or resilient insulating material or be complemented by a flexible solid wall tube 32 around the conductor. Also, when such is desirable, a rubber or similar covering may be molded, extruded or otherwise applied to the outer surface of conduit 14.

There is thus provided a novel conduit or enclosure unit comprising flexible and rigid parts secured together in a novel and advantageous manner which insures a sturdy and reliable joint. This joint or connection will withstand rough handling and usage under severe adverse conditions, including the continuous vibration to which said units are subjected in some uses for long periods of time. Additionally, said connection or coupling serves as an excellent radio shielding joint and protects the flexible conduit against failure by breakage. The extreme flexibility of the novel conduit hereby provided increases the effective and useful life thereof without in any way detracting from any of the other attributes of this type of structure. The novel connection comprehended also comprises but a small number of parts, and the same is not adversely affected by either high or low temperatures.

Although a limited number of embodiments or modifications of the invention have been illustrated in the drawings and described in the foregoing specification, it is to be expressly understood that the invention is not limited thereto. For example, the number of braided or inter-woven wire tubes may be varied and the rigid end-fitting connected to the flexible tubing may take any of a great variety of forms. Various other changes, such as in the materials suggested and in the specific design and arrangement of the parts illustrated, may be made without departing from the spirit and scope of the invention, as the same will now be understood by those skilled in the art.

What is claimed is:

1. A flexible shielding conduit comprising a plurality of braided wire tubes telescoped to form a multi-ply hose, a channel shaped annular ferrule fitted over the end of said hose, a tubular end-fitting telescoped with said ferrule, said fitting having an internal shoulder engaged by the end of said ferrule, and solder means securing the end portions of said tubes to each other and to said ferrule and securing said ferrule in said fitting.

2. A shielding conduit as defined in claim 1 wherein said ferrule consists of separate inner and outer cylinders having external and internal flanges, respectively, overlapping at one end to form the closed end of the ferrule.

3. A shielding conduit as defined in claim 1 wherein the closed end of the ferrule is perforated and said securing means extends through the perforations.

4. A shielding conduit as defined in claim 1 wherein said ferrule is a unitary piece.

5. A shielding conduit as defined in claim 1 wherein the end of the hose butts the end wall of the ferrule and the latter is crimped tightly around the end portion of the hose.

6. A shielding conduit as defined in claim 1 wherein the outer wall of the ferrule extends beyond the end-fitting and is flared outwardly from the hose.

7. The method of making a flexible shielding conduit which includes the steps of assembling a plurality of braided wire tubes in telescoped relation to form a multi-ply hose, soldering the end portions of said tubes together, placing a channel-shaped ferrule over the end portion of said hose, placing an end-fitting over said ferrule with solder disposed between the end of said ferrule and said fitting, heating the thus assembled parts to fuse the solder while axially compressing the assembly to thereby simultaneously connect the ferrule to both the fitting and the end portion of the hose.

8. A method as defined in claim 7 which includes placing a quantity of solder in said ferrule before placing the latter on the end portion of the hose.

9. The method of making a flexible shielding conduit which comprises assembling a plurality of braided wire tubes in telescoped relation to form a multiple layer hose, placing a channel-shaped annular ferrule having a perforated end wall over an end portion of said hose, placing an end-fitting over said ferrule with a quantity of solder interposed between the end wall of the ferrule and a shoulder in said fitting, applying axial compression to the assembled parts while heating the same to fuse the solder and cause the latter to flow into the ferrule through the perforations therein and around said ferrule to simultaneously secure said ferrule to the fitting and the end portion of said hose.

10. A method as defined in claim 9 including compressing the ferrule onto the end portion of the hose before placing the end-fitting over the ferrule.

11. A method as defined in claim 9 which includes soldering the end portions of said tubes together before placing the ferrule thereon.

12. A shielding conduit comprising a flexible hose constituted by a plurality of telescoped braided wire tubes, a channel-shaped ferrule embracing an end portion of said hose, and an end-fitting embracing said ferrule and connected by solder to said ferrule and the end portion of said hose.

References Cited in the file of this patent

UNITED STATES PATENTS

| | | |
|---|---|---|
| 1,900,511 | Madden | Mar. 7, 1933 |
| 2,098,615 | Cowdery | Nov. 9, 1937 |
| 2,099,915 | Weatherhead | Nov. 23, 1937 |
| 2,221,668 | Bowman | Nov. 12, 1940 |
| 2,295,830 | Carlson | Sept. 15, 1942 |
| 2,309,719 | Vaill | Feb. 2, 1943 |
| 2,577,049 | Uline | Dec. 4, 1951 |

FOREIGN PATENTS

| | | |
|---|---|---|
| 384,643 | Great Britain | Mar. 3, 1931 |
| 637,994 | Great Britain | May 31, 1950 |